United States Patent
Toth et al.

(10) Patent No.: US 9,458,937 B2
(45) Date of Patent: Oct. 4, 2016

(54) SHAFT SEAL ASSEMBLY WITH EXCLUSION PUMP DUST LIP

(71) Applicant: Federal-Mogul Corporation, Southfield, MI (US)

(72) Inventors: David M. Toth, Brighton, MI (US); Brent Sedlar, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/459,702

(22) Filed: Aug. 14, 2014

(65) Prior Publication Data

US 2016/0047474 A1 Feb. 18, 2016

(51) Int. Cl.
*F16J 15/32* (2016.01)

(52) U.S. Cl.
CPC ......... *F16J 15/3244* (2013.01); *F16J 15/3232* (2013.01)

(58) Field of Classification Search
CPC .... F16J 15/32; F16J 15/3204; F16J 15/3232; F16J 15/3244
See application file for complete search history.

(56) References Cited

U.S. PATENT DOCUMENTS

| | | | | |
|---|---|---|---|---|
| 3,633,927 A * | 1/1972 | Van Deven | .......... | F16J 15/3244 277/559 |
| 4,337,953 A * | 7/1982 | Ikeda | .................. | F16J 15/3232 180/254 |
| 4,705,277 A | 11/1987 | Repella | | |
| 5,645,283 A | 7/1997 | Drucktenhengst et al. | | |
| 6,409,177 B1 | 6/2002 | Johnston | | |
| 6,729,624 B1 | 5/2004 | Johnston | | |
| 7,770,897 B2 | 8/2010 | Berdichevsky | | |
| 7,854,432 B2 | 12/2010 | Berdichevsky | | |
| 7,854,433 B2 | 12/2010 | Berdichevsky | | |
| 8,011,673 B2 | 9/2011 | Berdichevsky | | |
| 8,066,287 B2 | 11/2011 | Berdichevsky | | |
| 8,413,995 B2 * | 4/2013 | Matsui | ................ | F16J 15/3244 277/559 |
| 8,556,270 B2 | 10/2013 | Toth et al. | | |
| 8,573,602 B2 | 11/2013 | Payne et al. | | |
| 8,800,996 B2 * | 8/2014 | Sedlar | .................. | F16J 15/3224 277/549 |
| 2011/0024989 A1 | 2/2011 | Berdichevsky | | |

FOREIGN PATENT DOCUMENTS

DE 3702018 C1 11/1987
FR EP 0284496 A1 * 9/1988 ........... F16J 15/3228

* cited by examiner

*Primary Examiner* — Kristina Fulton
*Assistant Examiner* — L. Susmitha Koneru
(74) *Attorney, Agent, or Firm* — Robert L. Stearns; Dickinson Wright PLLC (57) ABSTRACT

A shaft seal assembly including an elastomeric material molded to an annular metal shell is provided. The elastomeric material includes a lip extending from the annular shell to a lip distal end. The lip includes a first lip section projecting toward a center axis, and a second lip section projecting from the first lip section away from the center axis. A dust band is disposed between the first and second lip sections. The elastomeric material also includes flutes disposed on the second lip section and extending helically around the center axis and radially toward the center axis. The dust band can include vents, in which case one of the flutes extends from one side of each vent. The height of the flutes can increase from the dust band to the flute distal end, such that the flutes and the dust band have an equal interior diameter for engaging the shaft.

19 Claims, 7 Drawing Sheets

SHAFT SEAL ASSEMBLY WITH EXCLUSION PUMP DUST LIP

BACKGROUND OF THE INVENTION

1. Field of the Invention

The invention relates generally to shaft seal assemblies, and more particularly to shaft seal assemblies for industrial or vehicle applications.

2. Related Art

Shaft seals are commonly used throughout numerous types of industrial or vehicle applications. The shaft seals typically include an elastomeric material molded to an annular metal shell. The shaft seal is preferably designed to establish a reliable seal against a running surface of a rotating shaft or wear sleeve, in order to prevent the ingress of contamination and the egress of desirable lubrication. It is also desirable that the seal experience a low amount of stress when removed from a mold. A low radial load during use of the shaft seal assembly is also preferred, as the low load ultimately enhances the overall performance of the industrial or vehicle application.

SUMMARY OF THE INVENTION

The invention provides for a shaft seal assembly having improved dust or contamination exclusion performance, as well as reduced mold removal stress and reduced radial load during use in an industrial or vehicle application. The assembly includes an annular shell and an elastomeric material attached to the annular shell. Both the annular shell and the elastomeric material extend circumferentially around a center axis. The elastomeric material includes a lip extending from the annular shell to a lip distal end. The lip includes a first lip section, a second lip section, a dust band, and a plurality of flutes. The first lip section projects toward the center axis at an angle relative to a plane extending perpendicular to the center axis. The second lip section projects from the first lip section away from the center axis at an angle relative to the plane extending perpendicular to the center axis. The dust band is disposed between the first lip section and the second lip section and extends circumferential around the center axis and radially toward the center axis for engaging the shaft. The flutes are disposed on the second lip section and extend radially toward the center axis for engaging the shaft. Each flute extends from the dust band helically along the second lip section toward the lip distal end.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

The invention provides a dynamic shaft seal assembly 20 for preventing ingress of contamination and egress of lubrication along a shaft (not shown), for example a shaft of an industrial or vehicle application. In addition to preventing contamination from migrating from an outside air environment into a sealed region containing the lubrication, the shaft seal assembly 20 also provides lower mold removal stress and lower radial load, relative to comparative shaft seal assemblies. Exemplary embodiments of the shaft seal assembly 20 are shown in FIGS. 1-7.

Figure 3:
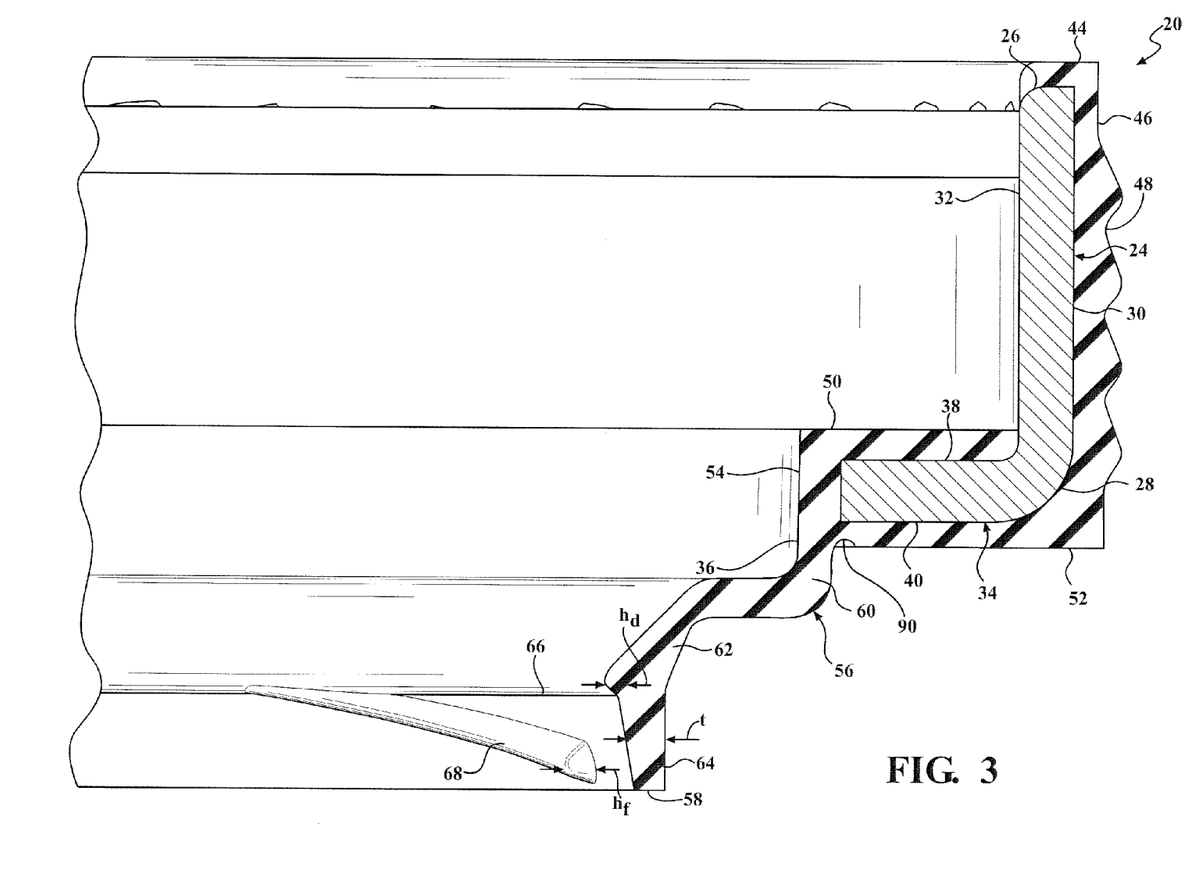
FIG. 3 is a partial cross-sectional view of a shaft seal assembly according to another exemplary embodiment.
Figure 5:
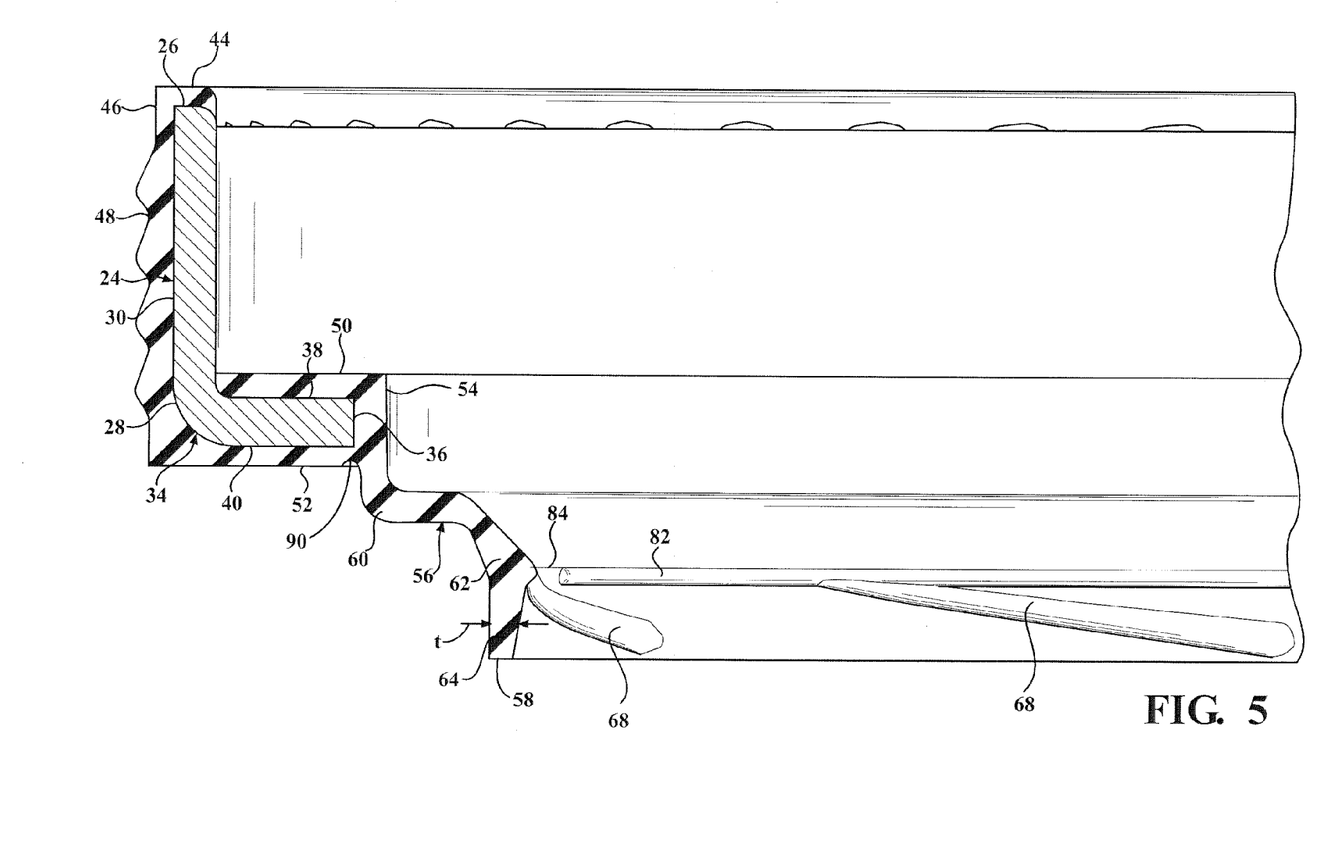
FIG. 5 is a partial cross-sectional view of the shaft seal assembly of FIGS. 1 and 2.
Figure 6:
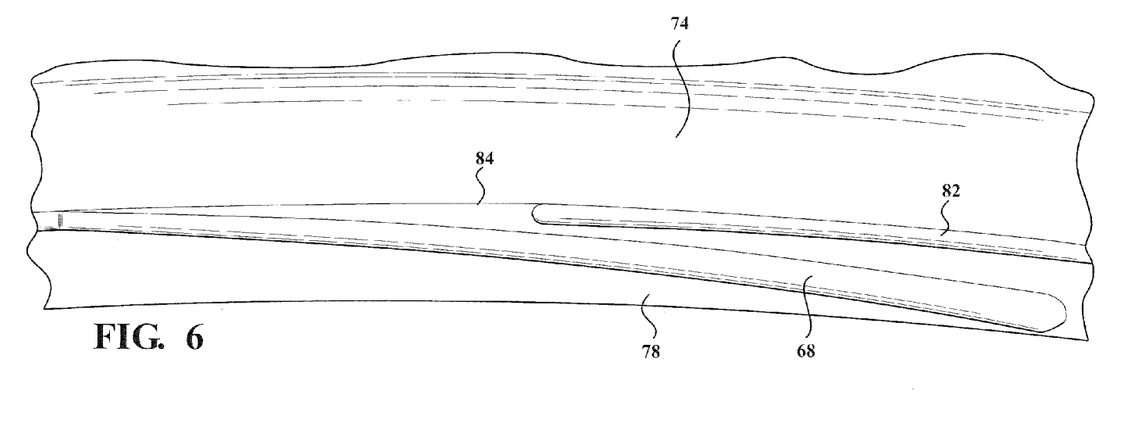
FIG. 6 is an enlarged view of a dust band and flute of the shaft seal assembly of FIGS. 1, 2, and 5.

The shaft seal assembly 20 includes an annular shell 22 extending circumferentially around a center axis A. The annular shell 22 is typically formed of a metal material, such as steel or aluminum, but can be formed of another type of material. In the exemplary embodiments, as best shown in FIGS. 3 and 5, the annular shell 22 includes a leg 24 having a cylindrical shape extending from a first end 26 along and parallel to the center axis A to a second end 28. The leg 24 includes an outer leg surface 30 facing away from the center axis A and extending from the first end 26 to the second end 28. The leg 24 also includes an inner leg surface 32 facing the center axis A and extending from the first end 26 to the second end 28.

The annular shell 22 of the exemplary embodiments also includes an inward projection 34 having an annular shape and extending from the second end 28 of the leg 24 toward and perpendicular to the center axis A to a base end 36. The inward projection 34 has a top surface 38 extending perpendicular to the center axis A and a bottom surface 40 extending perpendicular to the center axis A and facing opposite the top surface 38.

The elastomeric material 42 of the shaft assembly 20 comprises a single-piece of material attached to the annular shell 22. In the exemplary embodiments, the elastomeric material 42 is rubber molded to the annular shell 22, for example by injection molding. As best shown in FIGS. 3 and 5, the elastomeric material 42 includes an upper wall 44 extending along the first end 26 of the leg 24, and an outer wall 46 extending along the outer leg surface 30 from the first end 26 to the second end 28. The outer wall 46 of the elastomeric material 42 includes concentric groove 48 and is designed to engage a shaft housing (not shown), which typically presents a cylindrical shape. The elastomeric material 42 also includes an interior wall 50 extending along the top surface 38 of the inward projection 34 from the second end 28 of the leg 24 to the base end 36 of the annular shell 22 such that a majority of the inner leg surface 32 of the annular shell 22 remains exposed. The elastomeric material 42 also includes a lower wall 52 extending along the bottom surface 40 of the annular shell 22 from the second end 28 of the leg 24 to the base end 36 of the annular shell 22, and an inner wall 54 extending along the base end 36 of the annular shell 22 from the interior wall 50 to the lower wall 52.

The elastomeric material 42 also includes a lip 56, referred to as an exclusion pump dust (EPD) lip, projecting from the inner wall 54 along and toward the center axis A to a lip distal end 58. The lip 56 is designed to prevent dust or other contamination from migrating from the outside environment into the sealed region containing the lubrication, and thus improve the performance of the shaft seal assembly 20, and ultimately improve the performance of the industrial or vehicle application in which the shaft seal assembly 20 is used.

Figure 1:
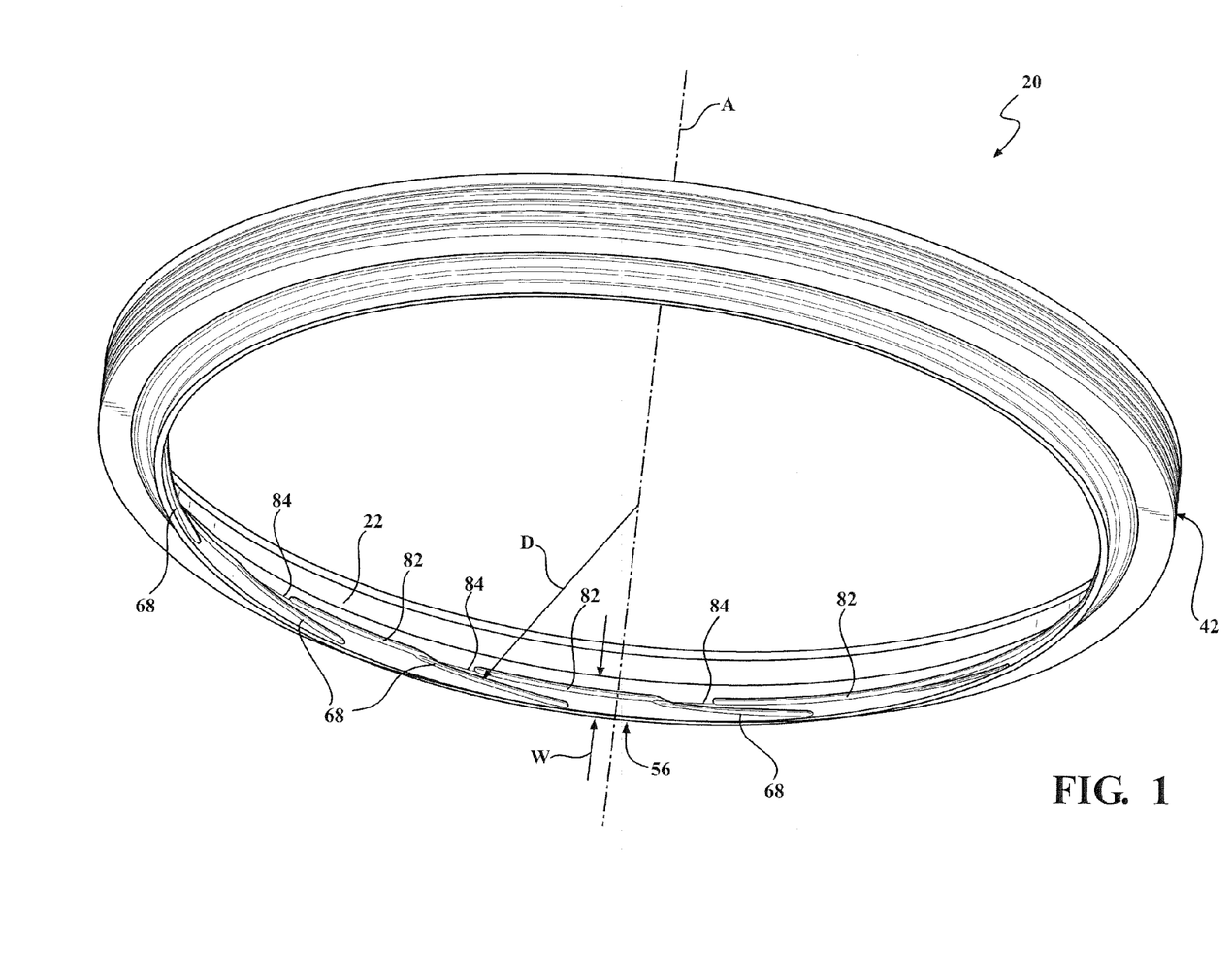
FIG. 1 is perspective view of a shaft seal assembly according to an exemplary embodiment.
Figure 2:
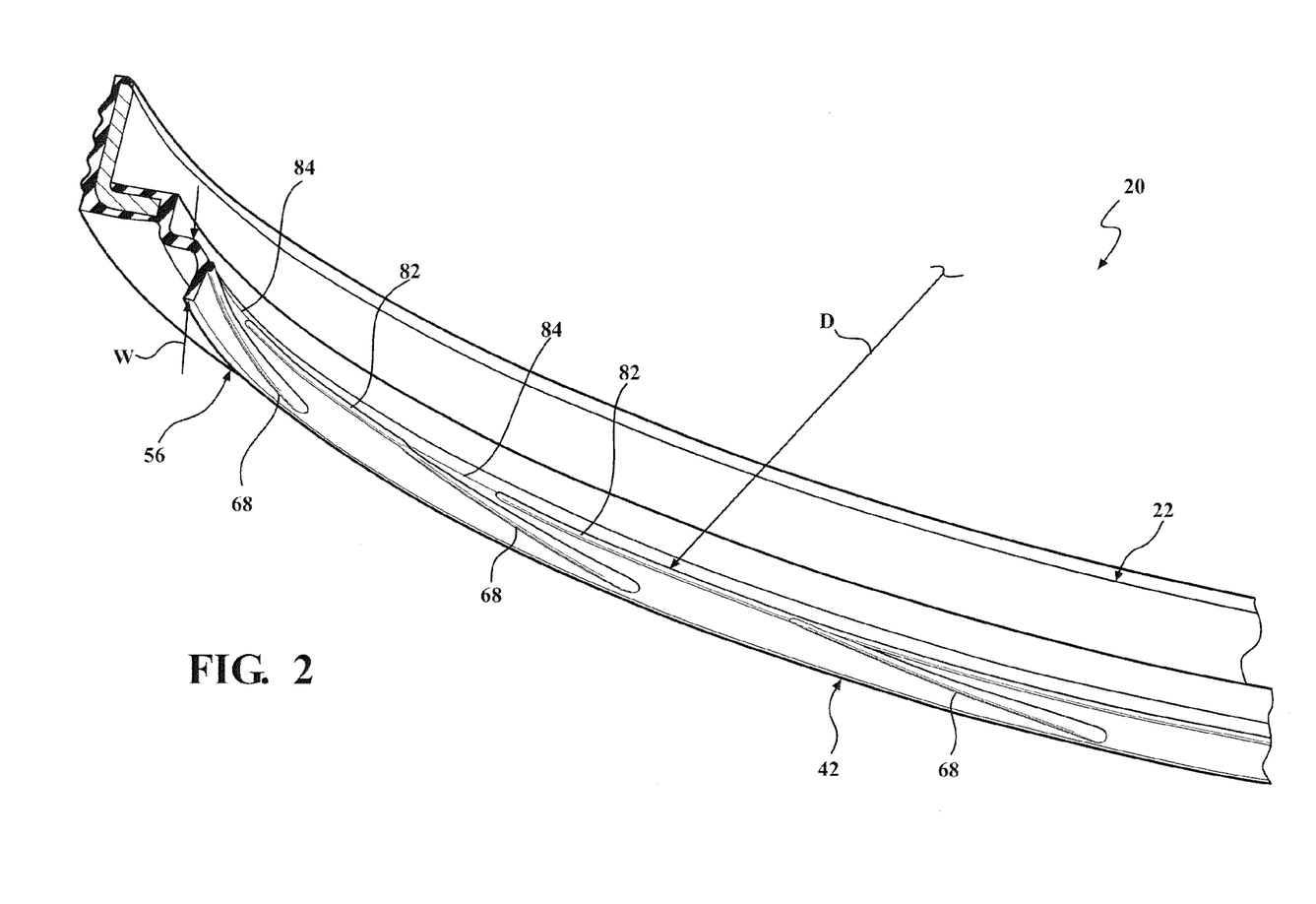
FIG. 2 is an enlarged view of a portion of the shaft seal assembly of FIG. 1.
Figure 3A:
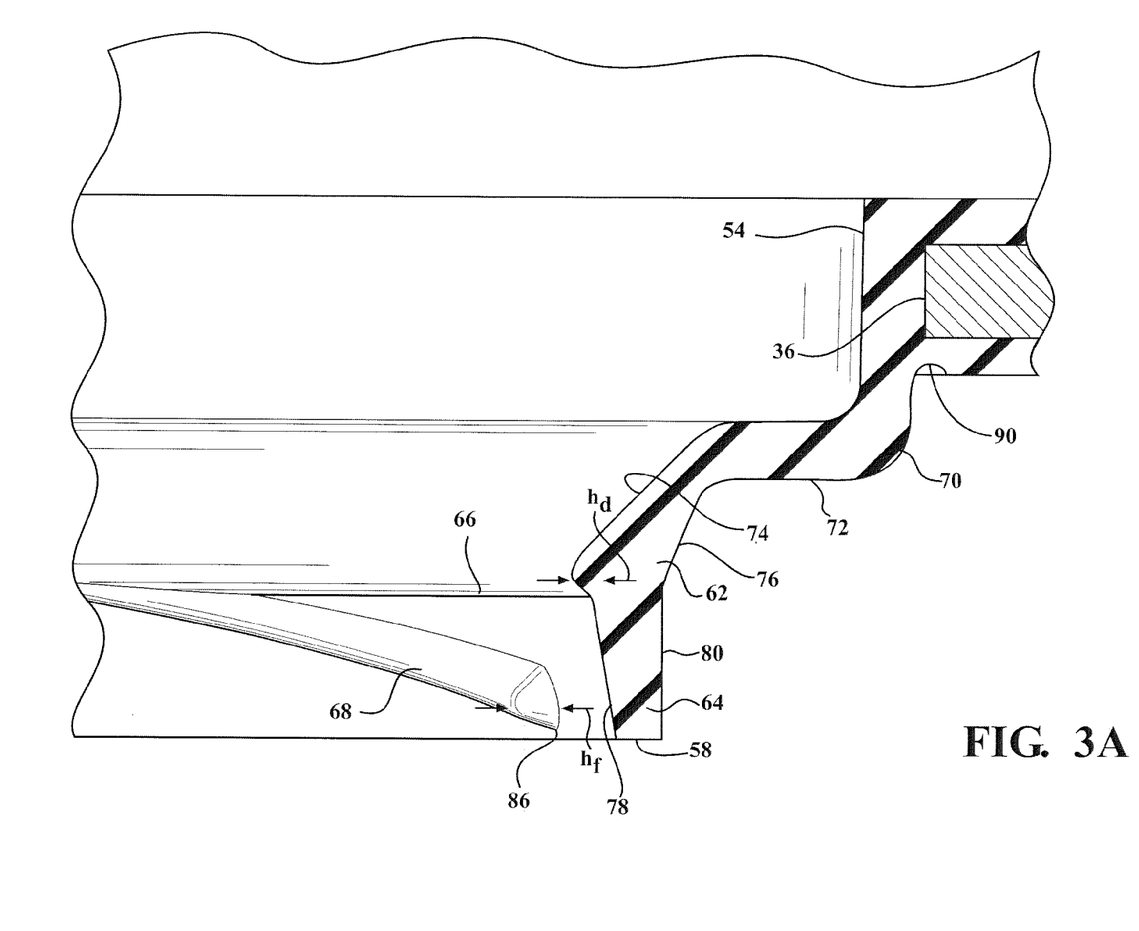
FIG. 3A is an enlarged view of a portion of FIG. 3.

The lip 56 of the elastomeric material 42 includes a bridge 60, a first lip section 62, a second lip section 64, a dust band 66, and a plurality of flutes 68. As best shown in FIGS. 1 and 2, the lip 56 presents an axial width w extending parallel to the center axis A and an interior diameter D extending perpendicular to the center axis A. As best shown in FIGS. 3, 3A, and 5, the bridge 60 of the exemplary embodiments includes a first bridge section 70 projecting from the inner wall 54 along and parallel to the center axis A, and a second bridge section 72 projecting from the first bridge section 70 toward the center axis A. In the exemplary embodiment, the length of the first bridge section 70 is less than the length of the second bridge section 72. The lip 56 of the elastomeric material 42 also has a thickness t which is lower along the first bridge section 70 than the second bridge section 72. The lower thickness t of the first bridge section 70 provides a better flex joint in the first bridge section 70 than the second bridge section 72 when removing the elastomeric material 42 from the mold.

The thickness t of the lower wall 52 of the elastomeric material 42 adjacent the inner wall 54 and the first bridge section 70 is also reduced to form a fillet 90, which allows the elastomeric material 42 to more easily bend relative to the center axis A. The fillet 90 also reduces mold removal stress, so that the elastomeric material 42 does not tear when removed from the mold during the manufacturing process. The fillet 90 can also reduce radial load during use of the shaft seal assembly 20.

The first lip section 62 of the elastomeric material 42 projects from the second bridge section 72 toward the center axis A at an angle, typically ranging from 25 to 85 degrees relative to a plane extending perpendicular to the center axis A. The first lip section 62 includes a first lip interior surface 74 facing toward the center axis A and extending away from the second bridge section 72 at an angle, typically ranging from 25 to 80 degrees relative to the plane extending perpendicular to the center axis A. The offset provided by the angle of the first lip interior surface 74 takes advantage of a torque leverage point and a reduced radial load, which is a function of the interference between the lip 56 and the shaft, as well as shaft to bore misalignment loading.

The first lip section 62 also includes a first lip exterior surface 76 facing away the center axis A and extending away from the second bridge section 72 at an angle, typically ranging from 30 to 85 degrees relative to the plane extending perpendicular to the center axis A. In the exemplary embodiments, the angle of the first lip interior surface 74 is greater than the angle of the first lip exterior surface 76, such that the thickness t of the lip 56 between the first lip interior surface 74 and the first lip exterior surface 76 increases in a direction moving toward the center axis A.

The second lip section 64 of the lip 56 projects from the first lip section 62 away from the center axis A at an angle, typically ranging from 1 to 50 degrees relative to a plane extending parallel to the center axis A. The second lip section 64 includes a second lip interior surface 78 facing toward the center axis A and extending away from the center axis A at an angle, typically ranging from 5 to 50 degrees relative to the plane extending parallel to the center axis A.

The second lip section 64 also includes a second lip exterior surface 80 facing away the center axis A and extending from the center axis A at an angle, typically ranging from 1 to 30 degrees relative to the plane extending parallel to the center axis A. The angle of the second lip interior surface 78 is preferably greater than the angle of the second lip exterior surface 80, such that the thickness t decreases along the second lip section 64 in a direction moving toward the lip distal end 58.

Figure 4:
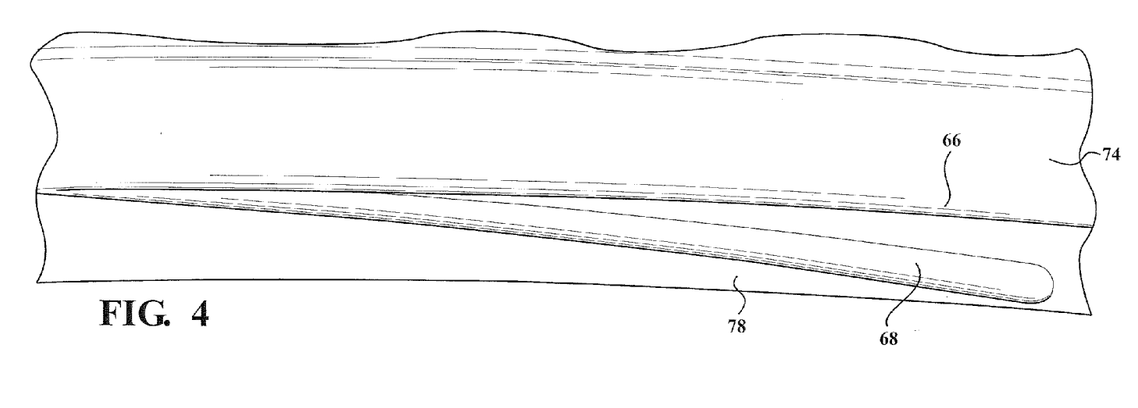
FIG. 4 is an enlarged view of a dust band and flute of the shaft seal assembly of FIGS. 3 and 3A.

The dust band 66 of the lip 56 is disposed between the first lip interior surface 74 and the second lip interior surface 78 and extends circumferential around the center axis A and radially toward the center axis A for engaging the shaft. In the exemplary embodiments, the axial width w and the interior diameter D of the dust band 66 are both constant around the entire circumference. The axial width w of the dust band 66 is less than the axial width w of the first lip section 62 and less than the axial width w of the second lip section 64. The interior diameter D of the dust band 66 is also less than the interior diameter D of the first lip section 62 and less than the interior diameter D of the second lip section 64. In one exemplary embodiment, the dust band 66 is a single piece of material extending continuously around the center axis A, as shown in FIGS. 3, 3A, and 4. In another exemplary embodiment, the dust band 66 includes a plurality of discrete band sections 82 spaced from the adjacent band section 82 by a vent 84, as shown in FIGS. 1, 2, 5 and 6.

The flutes 68 of the lip 56 are disposed on the second lip interior surface 78 and extend circumferentially around the center axis A. The flutes 68 also have a height $h_f$, as shown in FIGS. 3 and 3A, extending from the second lip interior surface 78 radially toward the center axis A for engaging the shaft. Each flute 68 extends from the dust band 66 helically along the second lip interior surface 78 to a flute distal end 86, typically at an angle of 2 to 45 degrees relative to the dust band 66. In the exemplary embodiments, the flute distal end 86 is spaced from the lip distal end 58. Like the dust band 66, the axial width w of each flute 68 is less than the axial width w of the first lip section 62 and less than the axial width w of the second lip section 64. The interior diameter D of each flute 68 is also less than the interior diameter D of the first lip section 62 and less than the interior diameter D of the second lip section 64. When the dust band 66 includes the vents 84, one of the flutes 68 extends from the dust band 66 adjacent one side of each of the vents 84 to the flute distal end 86.

The dust band also presents a height $h_d$ extending toward the center axis A, and the height $h_f$ of the flutes 68 is preferably not greater than the height $h_d$ of the dust band 66. In the exemplary embodiments, the height $h_f$ of the flutes 68 increases from the dust band 66 to the flute distal end 86. In this case, due to the angle of the second lip interior surface 78, the interior diameter D of the flutes 68 is constant from the dust band 66 to the flute distal end 86 and is equal to the interior diameter D of the dust band 66 around the entire circumference of the center axis A. In these embodiments, the axial width w of each flute 68 also increases continuously from the dust band 66 to the flute distal end 86.

In another embodiment (not shown), the height $h_f$ of each flute 68 is constant from the dust band 66 to the flute distal end 86. In this case, due to the angle of the second lip interior surface 78, the interior diameter D of the flutes 68 increases from the dust band 66 to the flute distal end 86 and is equal to the interior diameter D of the dust band 66 only at the flute distal end 86. The axial width w of each of the flutes 68 is also constant from the dust band 66 to the flute distal end 86 in this embodiment.

The dust band 66 and flutes 68 of the lip 56 lightly contact the shaft and thus prevent contaminants from migrating from the outside environment to the sealed lubricant region. The angle of the second lip interior surface 78 and flutes 68 are designed to scrap contaminants outward at the interface with the shaft. The vents 84 also prevent the dust or other contaminants from entering the sealed lubricant region. Any contaminants that accumulate along the dust band 66 form a barrier, and any excess contaminants are pushed back out into the environment and not into the sealed lubricant region.

Figure 7:
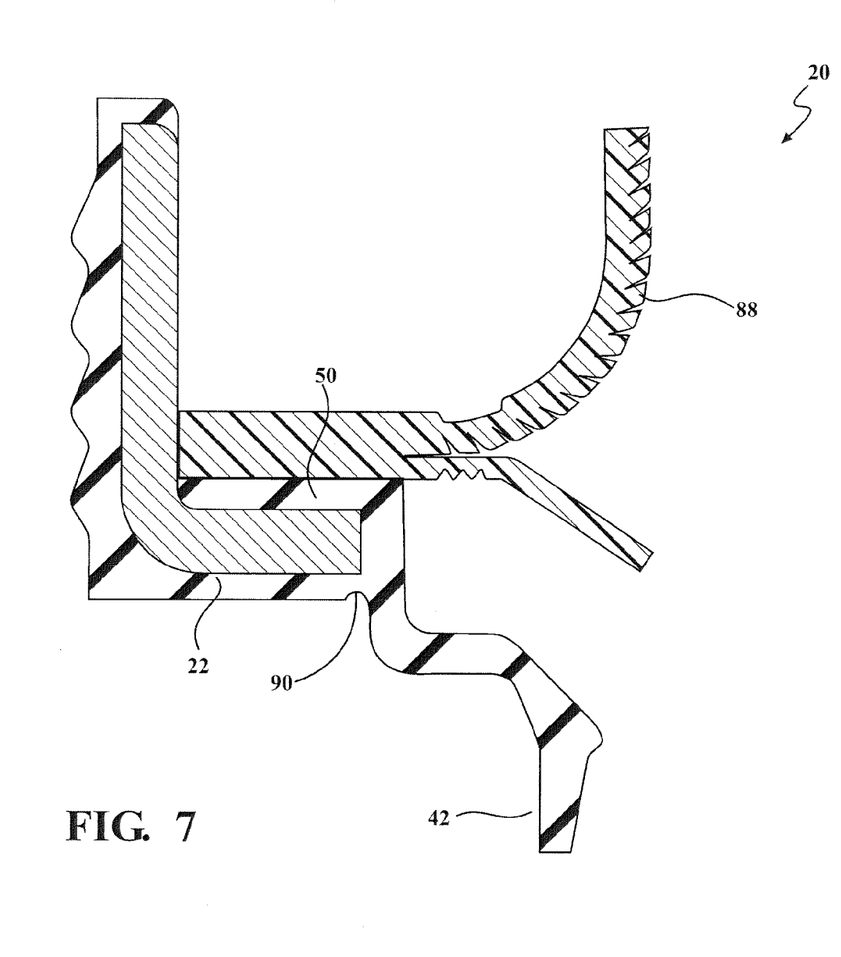
FIG. 7 is a cross-sectional view of a shaft seal assembly according to another exemplary embodiment including an auxiliary component.

In the exemplary embodiments, the bridge 60, first lip section 62, second lip section 64, dust band 66, and flutes 68 of the lip 56 are integral with one another and comprise a single piece of material. The walls 44, 46, 50, 52, 54 and the lip 56 of the elastomeric material 42 are also integral with one another and comprise a single piece of material. The elastomeric material 42 is typically injection molded to the annular shell 22, but can be attached by other methods. The design of the lip 56, especially the bridge 60, including the lower thickness t of the first bridge section 70 relative to the second bridge section 72, as well as the fillet 90 between the first bridge section 70 and the second bridge section 72, provides the advantage of low stress when the elastomeric material 42 is removed from the mold. In addition, an auxiliary piece 88, such as an auxiliary dust lip 56, can be easily molded or otherwise attached to one or more of the walls 44, 46, 50, 52, 54 and/or the lip 56 of the elastomeric material 42. FIG. 7 illustrates the auxiliary piece 88 attached to the interior wall 50, according to one exemplary embodiment.

Obviously, many modifications and variations of the present invention are possible in light of the above teachings and may be practiced otherwise than as specifically described while within the scope of the appended claims.

What is claimed is:

1. A dynamic shaft seal assembly, comprising:
an annular shell extending circumferentially around a center axis;
an elastomeric material attached to said annular shell and extending circumferentially around said center axis;
said elastomeric material including a lip extending from said annular shell to a lip distal end,
said lip including a first lip section projecting toward said center axis at an angle relative to a plane extending perpendicular to said center axis and extending to a dust band, said first lip section presenting an interior diameter extending perpendicular to said center axis;
said lip including a second lip section projecting from said dust band away from said center axis at an angle relative to the plane extending perpendicular to said center axis, said second lip section presenting an interior diameter extending perpendicular to said center axis;
said dust band being disposed between said first lip section and said second lip section and extending circumferentially around said center axis and radially toward said center axis for engaging the shaft;
said dust band presenting an interior diameter extending perpendicular to said center axis, said interior diameter of said dust band being less than said interior diameter of said first lip section and less than said interior diameter of said second lip section;
said lip including a plurality of flutes disposed on said second lip section and extending radially toward said center axis for engaging the shaft;
each of said flutes extending from said dust band helically along said second lip section toward said lip distal end; and,
each of said flutes extending from said dust band along said second lip section at an angle of 2 to 45 degrees relative to said dust band to a flute distal end spaced from said lip distal end.

2. The shaft seal assembly of claim 1, wherein said first lip section projects toward said center axis at an angle of 25 to 85 degrees relative to a plane extending perpendicular to said center axis; and said second lip section projects from said first lip section away from said center axis at an angle of 5 to 50 degrees relative to a plane extending parallel to said center axis.

3. The shaft seal assembly of claim 1, wherein said dust band includes a plurality of discrete band sections each spaced from the adjacent band section by a vent.

4. The shaft seal assembly of claim 3, wherein one of said flutes extends from said dust band adjacent one side of each of said vents.

5. A shaft seal assembly, comprising:
an annular shell extending circumferentially around a center axis;
an elastomeric material attached to said annular shell and extending circumferentially around said center axis;
said elastomeric material including a lip extending from said annular shell to a lip distal end,
said lip including a first lip section projecting toward said center axis at an angle relative to a plane extending perpendicular to said center axis and extending to a dust band, said first lip section presenting an interior diameter extending perpendicular to said center axis;
said lip including a second lip section projecting from said dust band away from said center axis at an angle relative to the plane extending perpendicular to said center axis, said second lip section presenting an interior diameter extending perpendicular to said center axis;
said dust band being disposed between said first lip section and said second lip section and extending circumferentially around said center axis and radially toward said center axis for engaging the shaft;
said dust band presenting an interior diameter extending perpendicular to said center axis, said interior diameter of said dust band being less than said interior diameter of said first lip section and less than said interior diameter of said second lip section;
said lip including a plurality of flutes disposed on said second lip section and extending radially toward said center axis for engaging the shaft;
each of said flutes extending from said dust band helically along said second lip section toward said lip distal end; and
wherein said interior diameter of said dust band is constant, said flutes present an interior diameter extending perpendicular to said center axis, and said interior diameter of said flutes is not greater than said interior diameter of said dust band.

6. The shaft seal assembly of claim 1, wherein said second lip section presents a second lip interior surface extending at an angle away from said center axis, and said flutes are disposed on said second lip interior surface.

7. The shaft seal assembly of claim 6, wherein said second lip interior surface extends at an angle of 5 to 50 degrees relative to a plane extending parallel to said center axis.

8. The shaft seal assembly of claim 6, wherein each of said flutes present an interior diameter extending perpendicular to said center axis and a height extending from said second lip interior surface toward said center axis, and said height of each of said flutes is constant from said dust band to said flute distal end such that said interior diameter of said flutes increases from said dust band to said flute distal end.

9. A shaft seal assembly, comprising:
an annular shell extending circumferentially around a center axis;
an elastomeric material attached to said annular shell and extending circumferentially around said center axis;
said elastomeric material including a lip extending from said annular shell to a lip distal end,
said lip including a first lip section projecting toward said center axis at an angle relative to a plane extending perpendicular to said center axis and extending to a dust band, said first lip section presenting an interior diameter extending perpendicular to said center axis;
said lip including a second lip section projecting from said dust band away from said center axis at an angle relative to the plane extending perpendicular to said center axis, said second lip section presenting an interior diameter extending perpendicular to said center axis;
said dust band being disposed between said first lip section and said second lip section and extending circumferentially around said center axis and radially toward said center axis for engaging the shaft;
said dust band presenting an interior diameter extending perpendicular to said center axis, said interior diameter of said dust band being less than said interior diameter of said first lip section and less than said interior diameter of said second lip section;
said lip including a plurality of flutes disposed on said second lip section and extending radially toward said center axis for engaging the shaft;
each of said flutes extending from said dust band helically along said second lip section toward said lip distal end;
said second lip section presenting a second lip interior surface extending at an angle away from said center axis, and said flutes being disposed on said second lip interior surface; and
wherein each of said flutes present an interior diameter extending perpendicular to said center axis and a height extending from said second lip interior surface toward said center axis, and said height of each of said flutes varies from said dust band to said flute distal end such that said interior diameter of said flutes is constant from said dust band to said flute distal end.

10. The shaft seal assembly of claim 9, wherein said interior diameter of said flutes is equal to said interior diameter of said dust band from said dust band to said flute distal end.

11. The shaft assembly of claim 10, wherein each of said flutes presents an axial width extending parallel to said center axis, and said axial width of said flutes increases from said dust band to said flute distal end.

12. The shaft seal assembly of claim 6, wherein said second lip section presents a second lip exterior surface extending at an angle toward said center axis, said second lip interior surface and said second lip exterior surface present a thickness therebetween, and said thickness decreases from said first lip section to said lip distal end.

13. The shaft seal assembly of claim 12, wherein said first lip section presents a first lip interior surface extending at an angle away from said center axis and a first lip exterior surface extending at an angle toward said center axis, said second lip interior surface and said second lip exterior surface present a thickness therebetween, and said thickness decreases toward said second lip section.

14. The shaft seal assembly of claim 1, wherein said first lip section and said second lip section and said dust band and said flutes comprises an integral and single piece of said elastomeric material.

15. The shaft seal assembly of claim 1, wherein said annular shell includes a leg having a cylindrical shape and extending from a first end along and parallel to said center axis to a second end; said leg includes an outer leg surface facing away from said center axis and extending from said first end to said second end; said leg includes an inner leg surface facing said center axis and extending from said first end to said second end; said annular shell includes an inward projection having an annular shape and extending from said second end of said leg toward and perpendicular to said center axis to a base end; and said inward projection has a top surface extending perpendicular to said center axis and an bottom surface extending perpendicular to said center axis and facing opposite said top surface.

16. The shaft seal assembly of claim 15, wherein said elastomeric material includes an interior wall extending along said top surface of said inward projection from said second end of said leg to said base end of said annular shell such that a majority of said inner leg surface of said annular shell remains exposed;
said elastomeric material includes a lower wall extending along said bottom surface of said annular shell from said second end of said leg to said base end of said annular shell;
said elastomeric material includes an inner wall extending along said free end of said annular shell from said interior wall to said lower wall; and
said lip of said elastomeric material includes a bridge having a first bridge section projecting from said inner wall along and parallel to said center axis and a second bridge section projecting from said first bridge section toward and said center axis to said first lip section.

17. The shaft seal assembly of claim 16, wherein said lip of said elastomeric material has a thickness being lower along said first bridge section than said second bridge section.

18. The shaft seal assembly of claim 16, wherein said lower wall of said elastomeric material has a thickness being reduced adjacent said inner wall and said first bridge section to form a fillet for allowing said elastomeric material to bend relative to said center axis.

19. A dynamic shaft seal assembly for preventing ingress of contamination and egress of lubrication along a shaft, comprising:
an annular shell formed of a metal material and extending circumferentially around a center axis;
said annular shell including a leg having a cylindrical shape and extending from a first end along and parallel to said center axis to a second end;
said leg including an outer leg surface facing away from said center axis and extending from said first end to said second end;
said leg including an inner leg surface facing said center axis and extending from said first end to said second end;
said annular shell including an inward projection having an annular shape and extending from said second end of said leg toward and perpendicular to said center axis to a base end;
said inward projection having a top surface extending perpendicular to said center axis and an bottom surface extending perpendicular to said center axis and facing opposite said top surface;

said metal material of said annular shell including steel or aluminum;

an elastomeric material attached to said annular shell and extending circumferentially around said center axis;

said elastomeric material including rubber and being molded to said annular shell;

said elastomeric material including an upper wall extending along said first end of said leg of said annular shell;

said elastomeric material including an outer wall extending along said outer leg surface from said first end to said second end for engaging a shaft housing;

said outer wall including concentric grooves;

said elastomeric material including an interior wall extending along said top surface of said inward projection from said second end of said leg to said base end of said annular shell such that a majority of said inner leg surface of said annular shell remains exposed;

said elastomeric material including a lower wall extending along said bottom surface of said annular shell from said second end of said leg to said base end of said annular shell;

said elastomeric material including an inner wall extending along said free end of said annular shell from said interior wall to said lower wall;

said elastomeric material including a lip projecting from said inner wall along and toward said center axis to a lip distal end;

said lip including a bridge having a first bridge section projecting from said inner wall along and parallel to said center axis and a second bridge section projecting from said first bridge section toward said center axis;

said lip of said elastomeric material having a thickness being lower along said first bridge section than said second bridge section;

said lower wall of said elastomeric material having a thickness being reduced adjacent said inner wall and said first bridge section to form a fillet for allowing said elastomeric material to bend relative to said center axis;

said lip including a first lip section projecting from said second bridge section toward said center axis at an angle of 25 to 85 degrees relative to said second bridge section and relative to a plane extending perpendicular to said center axis;

said first lip section including a first lip interior surface facing toward said center axis and extending away from said second bridge section an angle of 25 to 80 degrees relative to said plane extending perpendicular to said center axis;

said first lip section including a first lip exterior surface facing away said center axis and extending away from said second bridge section at an angle of 30 to 85 degrees relative to said plane extending perpendicular to said center axis;

said angle of said first lip interior surface being greater than said angle of said first lip exterior surface;

said first lip interior surface and said first lip exterior surface presenting a thickness therebetween, and said thickness increasing in a direction moving toward said center axis;

said first lip section having an axial width extending parallel to said center axis and an interior diameter extending perpendicular to said center axis;

said lip including a second lip section projecting from said first lip section away from said center axis at an angle of 1 to 50 degrees relative to a plane extending parallel to said center axis;

said second lip section including a second lip interior surface facing toward said center axis and extending away from said center axis at an angle of 5 to 50 degrees relative to said plane extending parallel to said center axis;

said second lip section including a second lip exterior surface facing away from said center axis and extending from said center axis at an angle of 1 to 30 degrees relative to said plane extending parallel to said center axis;

said angle of said second lip interior surface being greater than said angle of said second lip exterior surface;

said second lip interior surface and said second lip exterior surface presenting a thickness therebetween, and said thickness decreasing in a direction moving toward said lip distal end;

said second lip section having an axial width extending parallel to said center axis and an interior diameter extending perpendicular to said center axis;

said lip including dust band disposed between said first lip interior surface and said second lip interior surface and extending circumferential around said center axis and radially toward said center axis for engaging the shaft;

said dust band presenting an axial width extending parallel to said center axis and an interior diameter extending perpendicular to said center axis, said axial width and said interior diameter being constant and less than said interior diameter and said axial width of said first lip section and said second lip section;

said lip including a plurality of flutes disposed on said second lip interior surface and extending circumferentially around said center axis and radially toward said center axis for engaging the shaft;

each of said flutes extending from said dust band helically along said second lip interior surface to a flute distal end, said flute distal end being spaced from said lip distal end;

each of said flutes extending along said second lip interior surface at an angle of 2 to 45 degrees relative to said dust band;

said flutes presenting a height extending from said second lip interior surface toward said center axis;

said flutes presenting an axial width extending parallel to said center axis and an interior diameter extending perpendicular to said center axis, said axial width and said interior diameter being less than said interior diameter and said axial width of said first lip section and said second lip section; and said upper wall and said outer wall and said lower wall and said inner wall and said interior wall and said bridge and said first lip section and said second lip section and said dust band and said flutes of said lip being an integral and single piece of said elastomeric material.

* * * * *